UNITED STATES PATENT OFFICE.

VICTOR G. BLOEDE, OF CATONSVILLE, MARYLAND.

PROCESS FOR THE MANUFACTURE OF VEGETABLE GLUE.

1,396,315.   Specification of Letters Patent.   Patented Nov. 8, 1921.

No Drawing. Original application filed November 27, 1917, Serial No. 204,200. Divided and this application filed October 22, 1920. Serial No. 418,780.

*To all whom it may concern:*

Be it known that I, VICTOR G. BLOEDE, a citizen of the United States, residing at Catonsville, in the county of Baltimore and State of Maryland, have invented a new and useful Improvement in the Processes for the Manufacture of Vegetable Glue, of which the following is a specification.

This invention relates to an improved adhesive product for use in the woodworking art and other branches of industry requiring a very powerful adhesive, and which products are known in technology under the general classification of vegetable glues.

This application is a division of my application filed November 27, 1917, Serial #204,200, now Patent #1,357,310, issued November 2, 1920, in which the starch is acted upon by a base which has the property of entering into insoluble or semi-soluble combinations with amylaceous matter. In said application #204,200, the process described consists in combining with the starch employed a suitable base, which while in combination with an acid does not exert any coagulating action upon amylaceous matter, but which when this base is freed by the addition of a stronger base, immediately enters into chemical combination with the starch, producing the vegetable glue, which is the subject of the above invention.

It is, of course, obvious that if the so-called coagulating base described in my application #204200, instead of being produced by double decomposition within the body of a starch jelly, is added direct to the starch jelly, in its basic form, that a similar reaction would result from such direct combination and a similar product be obtained. This fact is clearly and fully stated in my original specification #204200 on page 3, lines 22 to 28 to wit:

"If milk of hydrate of lime or hydrate of barium be added to a clear starch paste, produced by boiling starch in water, the curdling of the starch is at once affected, but while this direct method of producing the coagulate desired might under special conditions be made to produce a composition, which could be used as a vegetable glue, this direct method is not the best or most practicable manner of producing the compound desired, for the reason, etc."

In carrying out my invention, I proceed as follows:

I first prepare a paste of starch by heating any of the ordinary grades of commercial potato, cassava, or other suitable amylaceous matter with water until a clear homogeneous jelly is produced. This operation should be performed in a jacketed kettle or mixer provided with a powerful mechanical agitator or stirrer. The proportion of water and starch used varies according to the character of the starch operated upon, the consistency or body desired in the finished product and the purposes for which the vegetable glue so produced is to be used, and may be roughly given as from one to five parts of water per pound of dry starch.

Having prepared the starch paste in the manner described, I agitate the paste until it has become perfectly smooth and reduced in temperature and then allow to flow into this composition a milk of hydrate of lime, baryta, or other equivalent base possessing the property of coagulating amylaceous matter.

In order to secure a perfectly smooth and colloidal composition, it is necessary to have the coagulating base in the finest possible state of mechanical division, and to run same into the starch jelly slowly and in a small stream and only as fast as the base will readily blend or assimilate with the starch jelly, continuous stirring and rapid agitation of the mass being also an essential feature during the time the base is being introduced. A rapid change takes place in the character of the starch jelly so operated upon, which assumes a very cohesive and glue-like condition as the reaction progresses.

The quantity of the coagulating base to be used also depends upon the character of the starch operated upon as well as the purpose for which the final product is to be used, also upon the strength and character of the coagulating base employed. While I do not limit myself to any particular base, as there are a number of more or less suitable equivalents available, I have found both the hydrate of lime and the hydrate of barium to be admirably fitted for my purposes. As the effect of the coagulating base is to rapidly thicken the starch paste after a certain point has been reached, only enough should be used to produce a maximum degree of homogeneity, adhesion, and cohesion in the composition operated upon.

I have found that for general purposes from one per cent. to five per cent. of the coagulating base (figured on the dry contents of the milk or suspension used and the dry starch) is a practical and satisfactory range of proportions, although I do not limit myself to any exact percentage as more or less may be found desirable according to the purposes for which the vegetable glue is to be used.

I have found that the most satisfactory results are produced when the hydrate of the base used is produced by precipitation, but I do not confine myself to this method of preparing the base, as I have also found that some of the available bases may be secured in a satisfactory state of division and suspension by mechanical means; for instance, highly burned lime may be slacked and by successive sieving or floating in water reduced to so fine a state of division that a concentrated milk of such material can be successfully used in my process, the whole question resting to a great extent upon the degree of sub-division of the particles of the base. As a general rule, however, I have found that the precipitated bases produce smoother and better results and can be quickly and easily made.

The following formula is given as typical for the production of a suitable coagulating base by the precipitation method, using the hydrate of lime as an example:

In a wooden tank or other suitable vessel, preferably provided with an agitator, place a solution of chlorid of calcium containing say five per cent. of dry calcium chlorid. Into this solution allow to run slowly and under agitation a solution of caustic soda until this ceases to produce a precipitate. Allow this composition to settle, then decant the water, and collect the sediment of the hydrate of lime in what is termed a milk form or suspension in water, and use the product so obtained in the treatment of the starch paste previously described. Instead of calcium chlorid, barium chlorid or other equivalent salt of a starch coagulating base may be used in producing these coagulating bases.

Having now fully described my process, which as already stated is an alternative process to that described in my application #204200 and when carefully carried out produces an equally good product, what I claim is:

The process herein described for the production of vegetable glue consisting in forming a paste or jelly of starch by first mixing the dry starch to a smooth cream with cold water, heating this composition to the point where the starch jellifies and then intimately combining with said paste or jelly a starch coagulating agent in basic form.

VICTOR G. BLOEDE.